July 28, 1953
H. O. THOMAS
2,646,857
GREASE DEFLECTOR
Filed Jan. 25, 1949
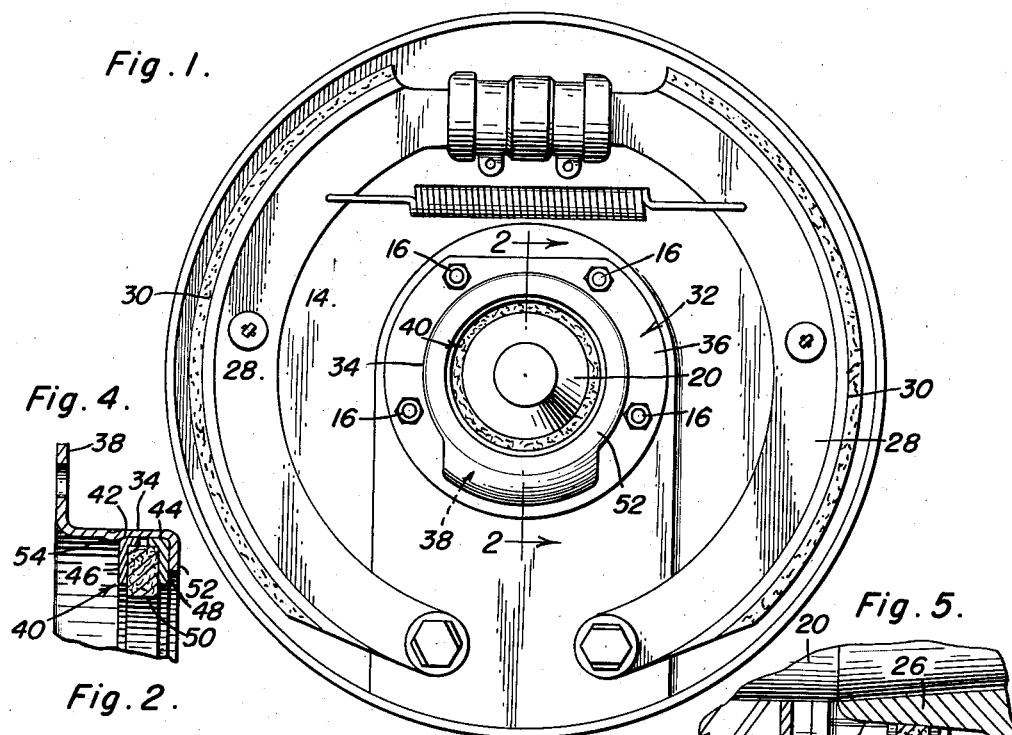
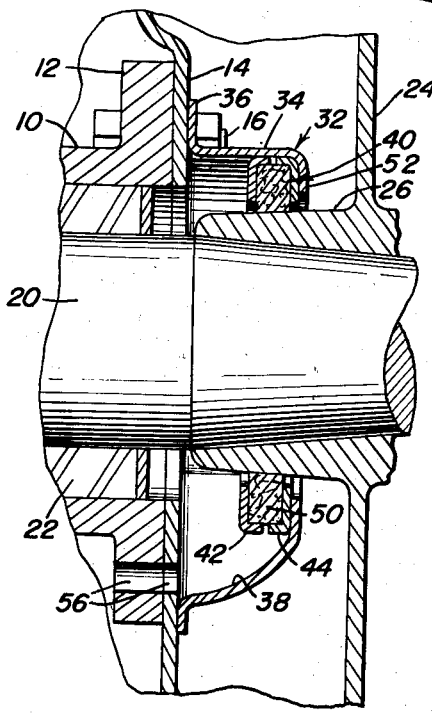
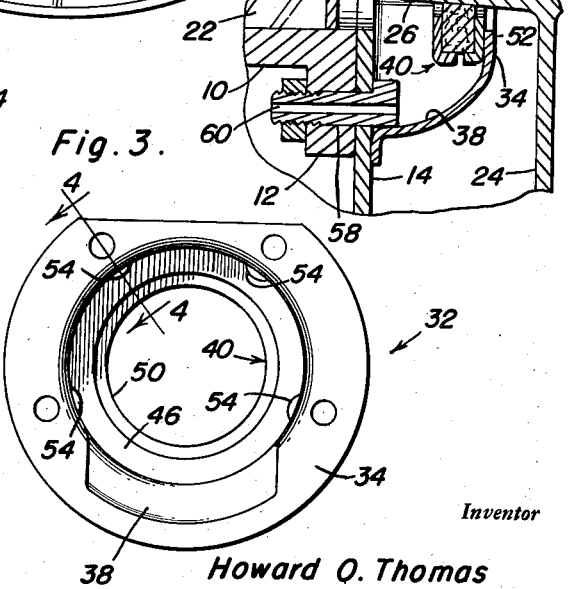
Inventor
Howard O. Thomas
By *Clarence A. O'Brien and Harvey B. Jacobson*
Attorneys Patented July 28, 1953

2,646,857

UNITED STATES PATENT OFFICE 2,646,857

GREASE DEFLECTOR

Howard O. Thomas, South Gate, Calif.

Application January 25, 1949, Serial No. 72,656

1 Claim. (Cl. 184—106)

This invention relates to new and useful improvements and structural refinements in grease retainers for rear axles of motor vehicles such as automobiles, and the like, and the principal object of the invention is to prevent lubricant in the rear axle housing from gaining entry into the brake drum and damaging or otherwise disturbing proper operation of the brake shoes by becoming soaked in the brake lining.

It is customary, of course, to provide so called grease retainers or oil shields in the rear axle unit, and while such grease retainers or oil shields may be effective in discouraging outward passage of grease, they are not efficient for positively preventing outward passage of grease after a certain amount of the lubricant has accumulated in the vicinity of the oil shields.

The primary feature of the invention is, therefore, to provide means for draining this accumulated lubricant so that this disadvantage of "leaking" oil shields is eliminated and all possibility of grease passing into the brake drums is avoided.

Another feature of the invention resides in the particular structure of the grease retainer per se, this being so arranged that the sealing elements thereof may be easily and conveniently replaced when worn.

Some of the advantages of the invention reside in its simplicity of construction, in its adaptability to convenient installation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is an elevational view showing a brake support together with the brake mechanism including brake shoes, the brake support being mounted upon an axle housing (not shown) containing the rear axle, but the brake drum being removed so as to expose the aforementioned component;

Figure 2 is a fragmentary cross sectional view taken substantially on the plane of the line 2—2 in Figure 1 and illustrating the brake drum in situ on the axle;

Figure 3 is an "inside" elevational view of the invention per se;

Figure 4 is a fragmentary cross sectional view, taken substantially on the plane of the line 4—4 in Figure 3, and;

Figure 5 is a fragmentary cross sectional view, substantially the same as that illustrated in Figure 2 but showing a modified embodiment of the invention.

Like characters of reference are employed to designate like parts in the specification and throughout the several views.

Referring now to the accompanying drawings in detail, the reference character 10 designates an end portion of the usual rear axle housing of a motor vehicle such as an automobile, the end of the housing being provided with an out-turned flange 12 to which is rigidly secured a brake support 14 by means of a plurality of bolt and nut assemblies 16.

An axle shaft 20 is rotatably positioned in suitable bearings 22 provided in the housing 10 and projects outwardly from the housing in order to carry a brake drum 24 which is provided with an inwardly projecting hub 26 whereby it is mounted on the projecting end portion of the axle shaft, as will be clearly apparent.

Needless to say, the usual brake shoes 28, equipped with brake lining 30, are provided in the brake drum 24 by being anchored to the brake support 14, and the invention resides in the provision of a grease retainer designated generally by the reference character 32, which is intended to prevent outward passage of grease from the axle housing 10 into the brake drum 24, which grease or lubricant, if permitted to enter the brake drum, would damage or otherwise impair the efficiency of the brake lining 30.

The grease retainer 32 embodies in its construction what may be referred to as a shield 34, configuated substantially as shown and provided with an out-turned flange 36 whereby it may be secured to the brake support 14 by the same fastening elements 16 which attach the brake support to the flange 12 of the axle housing 10, this shield being very similar to those commonly employed for a similar purpose on products of the "Chrysler Corporation." However, it is to be noted that the shield 34 is enlarged in its lower portion so as to provide what may be called a grease collecting chamber 38, this chamber being disposed under the axle 20 when the grease retainer shield is installed in position on the brake support 14, substantially as shown.

An annular seal unit 40 is provided in the grease retainer shield 34, this oil seal unit being of any suitable construction but preferably consisting of a pair of juxtaposed and separable annular members 42, 44 provided at their outer edges with inturned keeper flanges 46, 48 respectively (see Figure 4) and having positioned therebetween an annular sealing element 50, such as for example, a ring of felt.

It is to be noted that the grease retainer shield 34 is also formed with an inturned flange 52 provided with what may be referred to as a seat for the seal unit 40, the seal unit 49 being retained in position against the seat 52 as shown in the drawings by simply striking a plurality of spaced detents 54 in the lateral wall of the shield 34, as is best illustrated in Figures 3 and 4. By virtue of this arrangement, the seal unit 40 may be readily separated from the shield 34 by simply forcing the detents 54 outwardly, whereupon the seal unit may be withdrawn as a whole and the members 42, 44 thereof separated for the purpose of replacing the seal element 50 when the latter has become worn.

As is best shown in Figure 2, the element 50 of the seal unit 49 frictionally engages the inwardly projecting hub 26 of the brake drum 24 and thereby prevents possible leakage of lubricant from the housing 10 into the brake drum and on the brake shoe lining 30. However, this safeguarding feature alone is insufficient, since after a certain amount of lubricant accumulates in the vicinity of the seal unit 40, the lubricant has a tendency to pass outwardly beyond the element 50 so that the utility of the grease retainer is considerably impaired if not rendered altogether ineffective. To avoid this disadvantage, the grease collecting chamber 38 has been provided in the grease retainer shield 34, into which chamber the excess lubricant may gravitate and from which it is automatically discharged by gravitational forces through a drain passage 56 extending through the brake support 14 and through the housing flange 12, whereby the excess lubricant drains on the ground. It is to be noted that the passage 56 simply assumes the form of aligned apertures provided in the flange 12 and the brake support 14 which were originally intended to receive one of the fastening elements 16. When the invention is placed in use, one of the fastening elements which secure the retainer 32 to the support 14 and the support 14 to the housing flange 12 is omitted so as to provide the passage 56 through which excess lubricant may drain from the grease collecting chamber 38, substantially as shown.

However, since the elements 16 not only secure the grease retainer 32 to the brake support 14 but also secure the latter to the hub flange 12, it may not be desirable to omit one of the fastening elements when the invention is placed in use, since the attachment of the brake support 14 to the housing flange 12 may be somewhat weakened. Under such circumstances a fastening element 58 indicated in Figure 5 may be used, this element being formed with a drain passage 60 through which the excess lubricant may escape and being provided only for securing the brake support 14 to the housing flange 12, but not for securing the grease retainer 32 to the brake support, substantially as shown. In any event, it is to be noted that the drain passage 56 or 60, as the case may be, communicates with the lower end portion of the grease collecting chamber 38, as will be clearly apparent.

It is believed that the advantages and use of the invention will be readily understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

The combination of a vehicle axle housing having an axle rotatable therein, a brake drum having a hub mounted on said axle, a flange on said housing provided with a circle of apertures, one of which is disposed substantially below said axle, a brake support abutting said flange and provided with a circle of apertures in register with the apertures in the flange, a hollow grease retainer abutting said brake support and including a seal in frictional engagement with said hub, said grease retainer being provided with a set of apertures in register with all the apertures in the brake support and flange excepting the apertures below the axle, a plurality of fastening elements provided in all the registering apertures except those below the axle whereby to secure said shield and said support to said flange, and a fastening screw positioned in the registering apertures below the axle and coacting with said fastening elements to secure said support to said flange, said fastening screw being provided with an axial bore affording an outlet passage in communication with the interior of the grease retainer whereby excess grease therein may gravitate to the ground.

HOWARD O. THOMAS.

References Cited in the file of this patent
UNITED STATES PATENTS

| Number | Name | Date |
|---|---|---|
| 1,227,543 | Limpp | May 22, 1917 |
| 1,417,410 | Ram | May 23, 1922 |
| 1,561,373 | Trautner | Nov. 10, 1925 |
| 1,761,927 | Main | June 3, 1930 |
| 1,816,172 | Booth | July 28, 1931 |
| 2,145,089 | Kysor | Jan. 24, 1939 |
| 2,181,235 | Hurrell | Nov. 28, 1939 |
| 2,371,952 | Cox | Mar. 20, 1945 |
| 2,485,993 | Halteren | Oct. 25, 1949 |